United States Patent [19]
Colombo

[11] Patent Number: 4,878,164
[45] Date of Patent: Oct. 31, 1989

[54] POWER SUPPLY GRADUALLY DEVELOPING AN OUTPUT VOLTAGE WHEN SWITCHED ON

[75] Inventor: Alessandro Colombo, Monza, Italy

[73] Assignee: SGS- Thomson Microelectronics s.r.l., Catania, Italy

[21] Appl. No.: 304,796

[22] Filed: Jan. 31, 1989

[30] Foreign Application Priority Data

Feb. 4, 1988 [IT] Italy .................... 83605 /88

[51] Int. Cl.$^4$ .................. H02M 7/517; H02M 7/5375
[52] U.S. Cl. ........................................ 363/49; 307/85; 307/228; 323/901
[58] Field of Search .................. 363/49; 323/901, 908; 361/71; 307/85

[56] References Cited

U.S. PATENT DOCUMENTS

| | | | |
|---|---|---|---|
| 4,375,614 | 3/1983 | Steiner | 323/901 |
| 4,417,218 | 11/1983 | Berke | 307/228 |
| 4,598,351 | 7/1986 | Fair et al. | 363/49 |
| 4,628,431 | 12/1986 | Kayser | 323/901 |

Primary Examiner—William H. Beha, Jr.
Attorney, Agent, or Firm—Bierman and Muserlian

[57] ABSTRACT

The damaging effects caused by an abrupt rise of the supply voltage on particularly sensitive circuits when power is returned to the distribution network after a blackout, are prevented by providing the power supply with means for controlling a gradual rise of the output voltage thereof in accordance with a pre-established ramp when the power supply is switched-on. These means utilize a microprocessor driving at least one low-to-high type level shifter having a load formed by a network of resistors with scaled values, for generating an output analog voltage signal corresponding to a digital value presented by the microprocessor at the logic gate driving the level shifter circuit. The analog voltage signal, properly buffered, is applied to a control terminal of the power supply.

1 Claim, 1 Drawing Sheet

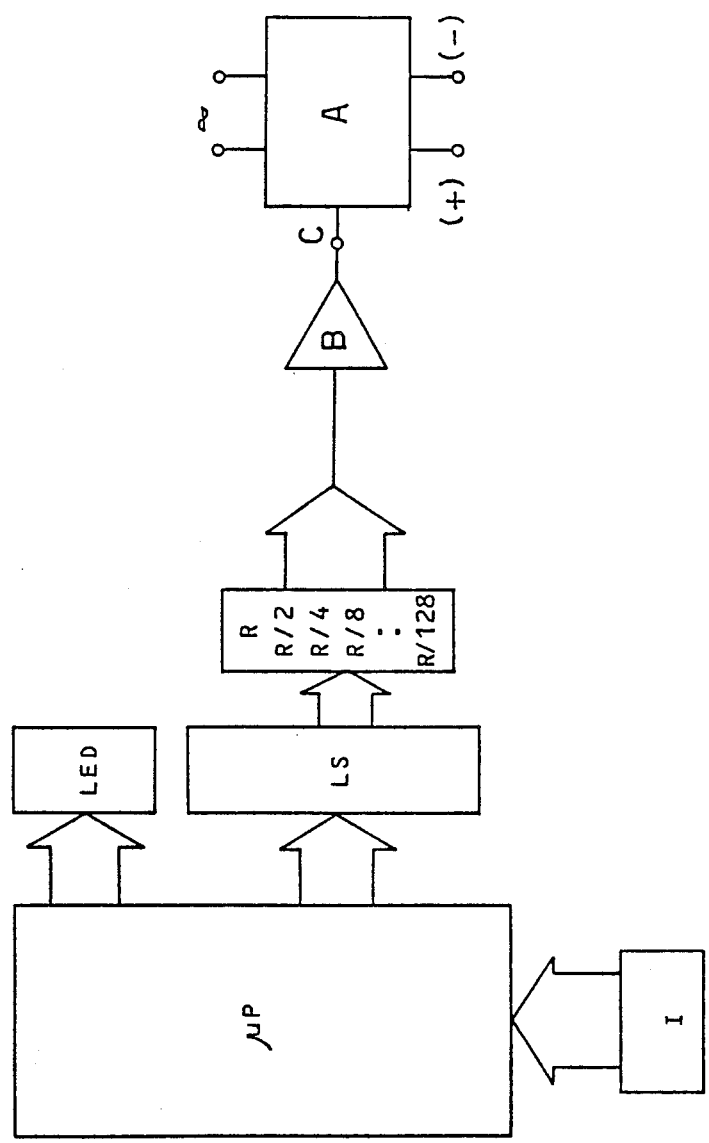

POWER SUPPLY GRADUALLY DEVELOPING AN OUTPUT VOLTAGE WHEN SWITCHED ON

BACKGROUND OF THE INVENTION

1. Field of the invention

The present invention relates to stabilized supplies, generally used for constant voltage or constant current supply of electronic circuits, in particular electronic circuits and devices during testing thereof.

2. Description of the prior art

Stabilized power supplies are well known instruments, and are largely employed in R & D and in test laboratories for arranging preset test conditions of devices and electronic circuits. Often these supplies, wherein it is generally possible to manually set by means of appropriate controls a desired output constant voltage or current, are also provided with a control terminal to which a control voltage may be applied in order to automatically set the desired value of the constant output voltage or current. In complex testing procedures, the control of the supply voltages and/or of the supply currents delivered by one or more stabilized power supplies to the devices being tested may be performed by a central processing unit (CPU).

If during the carrying out of a test procedure the power is momentarily interrupted, when the latter is reestablished, the power supplies are reactivated and deliver across their output terminals the voltages which had been set previously. These voltages will become available at the respective output terminals abruptly causing a voltage peaking (and/or a current peaking) which may negatively affect the reliability of the test results and often damage delicate devices which are powered by these stabilized supplies.

Certain problems caused by accidental power interruptions, may be particularly serious when performing "life test" procedures of an integrated reliability test program, wherein the stability of the supply voltage and of the dynamic signals applied to the devices under test becomes extremely important. This may the case of a back-end testing of micrologics (integrated logic devices) with a high level of integration.

OBJECTIVE AND SUMMARY OF THE INVENTION

It is an object of the present invention to provide a stabilized power supply, the output voltage or current of which may be digitally set and wherein when power is reestablished after an accidental blackout, the output constant voltage or constant current which was set is not delivered instantaneously but in accordance with a preset ramp.

According to an embodiment of the invention, it is sufficient to provide an existing stabilized supply with easily implemented control means, utilizing a limited number of relatively low cost components in order to obtain a supply having the desired characteristics.

DESCRIPTION OF THE PREFERRED EMBODIMENT

A block diagram of the control means for a stabilized supply made in accordance with the present invention is shown in the figure.

A stabilized supply to be provided with the control means of the present invention is depicted in the figure by the block A. The terminals for connection to the power distribution network and the output terminals (+) and (−), as well as a control terminal C for setting by means of an appropriate external signal the desired constant output voltage (or current) are also clearly indicated in the figure.

The control means of the invention comprise an integrated microprocessor $\mu P$, which may contain an EPROM memory section of 32K. A level shifter block LS is driven by the microprocessor through a logic output gate thereof and the level shifter circuit or the level shifter circuits are loaded at an output thereof by a network of load resistors: R, R/2, R/4, R/8 ... R128, having scaled values: the highest value resistor being connected to the most significative bit output terminal of the level shifter circuit and the lowest value resistor being connected to the terminal correspondent to the less significative bit, according to techniques known to the skilled technician. The voltage signal across the network of resistors is preferably buffered, i.e. it is applied to the input of an unitary gain voltage amplifier B, and it is applied to the control terminal C of the stabilized power supply A. The level shifter and the network of scaled load resistors constitute essentially a digital-to-analog converter (DAC) capable of generating a voltage ramp having characteristics which are dictated by data which may be permanently programmed in the EPROM section of the microprocessor.

The memory capacity of a modern integrated microprocessor (e.g. a 32K $\mu P$) is sufficient to permit the storage of a relevant number of executive programs, an essential characteristic of which is that of generating, through the digital-to-analog converter formed by the level shifter and by the network of load resistors, a voltage ramp starting from a null value and rising to a preset value through a rise path which may also be programmed, every time power is returned after a blackout. The selection of either one or another of a plurality of programs stored in the memory (EPROM) section of the microprocessor $\mu P$, may take place by means of a plurality of external selection switches or any other equivalent control means.

A second logic output gate of the microprocessor may be utilized for driving a decoder driving a plurality of LED (Light Emitting Diode) indicators for providing a visual confirmation of the selected program.

Preferably, according to an embodiment of the invention, tow or more integrated level shifters of the low-to-high type may be utilized for an enhanced refinement of the output characteristics according to well known techniques, each level shifter having its output terminals loaded by means of a series of resistors of decreasing value (160K, 80K, 40K, 20K, 10K, 5K, 2,5K and 1,2K): the highest value resistor being connected to the more significative bit terminal and the lowest value resistor to the less significative bit terminal. Clearly, to an hexadecimal value data presented on the logic output gate of the microprocessor, a corresponding analog voltage will be available at the output terminal of the relative load resistor network. The rise characteristic of the output analog voltage from a null value to a preset value, may also be readily programmed by means of the microprocessor.

The power supply of the invention provided with such control means, besides preventing an abrupt voltage peaking when power is returned to the distribution network lends itself, through a simple software program, to perform any type of variation of the output voltage or output current delivered in function of time.

Of course, the devices composing the control system of the invention will be powered by means of a dedicated power supply which may also be connected to the same power distribution network.

What I claim is:

1. A power supply wherein the output voltage thereof is set by applying a control voltage to a control terminal of said power supply and capable of gradually developing said output voltage, on switching-on of the power supply, from zero to a preset value, characterized by comprising a microprocessing having a plurality of input and output logic gates;

at least a low-to-high type level shifter circuit driven by said microprocessor through at least one of said output logic gates thereof and having output terminals connected to a network of load resistors of scaled values: the highest value resistor being connected to the most significative bit output terminal and the lowest value resistor being connected to the less significative bit output terminal of said level shifter circuit, an analog voltage signal corresponding to a digital value presented by said microprocessor at said logic gate thereof being produced across two output terminals of said network of load resistors;

an analog buffer driven by said analog voltage signal and having an output terminal connected to said control terminal of said power supply;

selection means, connected to an input logic gate of said microprocessor, capable of determining a certain ramp for the rising of the output voltage delivered by said power supply from zero to a preset value on switching-on of the power supply.

* * * * *